(No Model.)

J. W. RINGROSE.
Fly Net for Horses.

No. 233,806.                              Patented Oct. 26, 1880.

Witnesses:
A. H. Norris
J. Henry Kaiser

Inventor:
Jesse W. Ringrose
By James L. Norris.
Atty

UNITED STATES PATENT OFFICE.

JESSE W. RINGROSE, OF MECHANICSBURG, PENNSYLVANIA, ASSIGNOR OF ONE-HALF TO JAMES S. HUSTON, OF SAME PLACE.

FLY-NET FOR HORSES.

SPECIFICATION forming part of Letters Patent No. 233,806, dated October 26, 1880.

Application filed September 25, 1880. (No model.)

*To all whom it may concern:*

Be it known that I, JESSE W. RINGROSE, a citizen of the United States, residing at Mechanicsburg, in the county of Cumberland and State of Pennsylvania, have invented new and useful Improvements in Fly-Nets for Horses, of which the following is a specification.

My invention relates to that class of leather fly-nets for horses in which the lashes are passed through holes in the ribs, so as to form a net having its lashes arranged in parallel lines.

In some instances the lash, after being passed through a hole in the rib, has been secured by being wound once around the rib, and then passed under itself before being carried onto the next rib, and in other instances the lash has been passed through a hole in the rib, and then, after being carried once around the rib, again passed through the same hole, after which it is carried on and connected with the next rib in a similar manner.

Again, the rib of a leather fly-net has been formed with a line of holes or perforations arranged in pairs, and the lash passed through a hole of one of said pairs from one side of the rib, then carried to and passed through the remaining hole of said pair of holes, after which it is carried onto the next rib, the slipping of the rib being prevented solely by friction.

In the first two mentioned cases the net has not a neat appearance in consequence of the wrapping of the lashes around the ribs, and in the first of said instances the ribs will not be held flat upon the animal during use.

In the last of these above-mentioned cases the lash is not arranged in a continuous straight line, which mars the appearance of the net, and, moreover, during use the ribs are liable to slip.

Under my improvement I form the rib with a line of holes arranged in pairs, as heretofore, and after passing the lash through one of the holes of one pair from one side of the rib, and then to and through the remaining hole of said pair back to the side of the rib from which the lash was first passed through it, I secure the lash by tying its ends in a single knot upon the under side of the rib, and then carry the free end of the lash on to the next rib, through which it is passed and secured in like manner.

Figure 1:
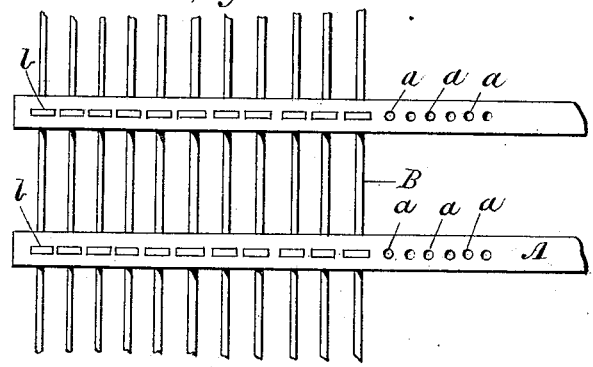
Figure 2:
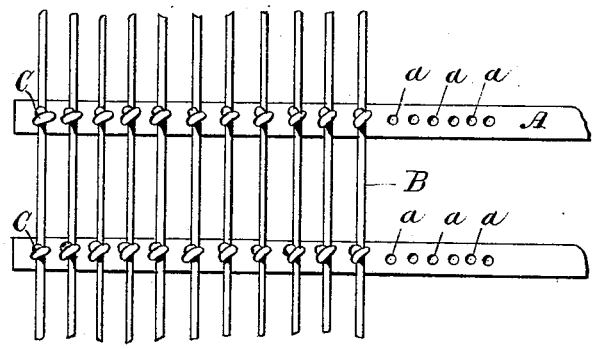

In the drawings, Figure 1 is a top or plan view of a portion of a leather fly-net formed in accordance with my invention, and Fig. 2 is a similar view of the under side of the portion of the leather fly-net represented in Fig. 1.

The letter A refers to the ribs, which consist of leather strips, such as ordinarily employed in the manufacture of fly-nets, and *a a* refer to the holes or perforations, one line of which is formed through each rib. These holes may be formed at regular intervals along the ribs, or they may be arranged in pairs when desired.

The letter B refers to the lashes which are passed through the holes of the ribs and secured by knots against the under sides of the ribs, as illustrated in Fig. 2.

In thus connecting the lashes and the ribs, a lash is passed through one of the holes of the rib, and then carried along the top surface of the rib in the direction of the length of the latter to the next hole of the series, through which it is passed, so as to leave only the short portion *b* of the lash upon the upper surface of the rib. The lash is then tied in a single knot, C, under the rib by passing the free end of the lash around that portion of the lash which is between two adjacent ribs, and then drawing upon the said free end, so as to form a close knot under the rib. Under this arrangement the ribs cannot slip upon the lashes, and they will lie flat upon the animal, while at the same time the knots are concealed by the ribs, and each lash continued in a right line from one of its ends to the other.

What I claim is—

A leather fly-net for horses, formed with each of its lashes passing through two separate holes in the rib and tied in a knot against the under side of the rib, substantially in the manner specified.

In testimony whereof I have hereunto set my hand in the presence of two subscribing witnesses.

JESSE W. RINGROSE.

Witnesses:
JAMES L. NORRIS,
JAMES A. RUTHERFORD.